(12) United States Patent
Yamaguchi (10) Patent No.: US 7,598,638 B2
(45) Date of Patent: Oct. 6, 2009

(54) STATOR AND AXIAL-GAP BRUSHLESS VIBRATION MOTOR INCORPORATING THE STATOR

(75) Inventor: Tadao Yamaguchi, Isesaki (JP)

(73) Assignee: Tokyo Parts Industrial Co., Ltd., Gunma-Ken (JP)

( * ) Notice: Subject to any disclaimer, the term of this patent is extended or adjusted under 35 U.S.C. 154(b) by 492 days.

(21) Appl. No.: 11/473,283

(22) Filed: Jun. 22, 2006

(65) Prior Publication Data

US 2007/0040462 A1 Feb. 22, 2007

(30) Foreign Application Priority Data

Aug. 19, 2005 (JP) .............................. 2005-238288

(51) Int. Cl.
*H02K 7/06* (2006.01)
(52) U.S. Cl. ....................................................... 310/81
(58) Field of Classification Search ................... 310/81, 310/67 R; 381/396, 412, 418, 419
See application file for complete search history.

(56) References Cited

U.S. PATENT DOCUMENTS 6,417,589 B1 7/2002 Kuyama et al.

| | | | |
|---|---|---|---|
| 6,573,627 B2 * | 6/2003 | Sun | 310/81 |
| 6,819,021 B1 * | 11/2004 | Horng et al. | 310/91 |
| 6,836,039 B2 * | 12/2004 | Choi et al. | 310/81 |
| 2008/0018187 A1 * | 1/2008 | Yamaguchi et al. | 310/81 |

FOREIGN PATENT DOCUMENTS

| JP | 4-137463 | 12/1992 |
|---|---|---|
| JP | 11-252886 | 9/1999 |
| JP | 2000-262969 | 9/2000 |
| JP | 2002-245103 | 9/2000 |
| JP | 2002-142427 | 5/2002 |
| JP | 2002-143767 | 5/2002 |
| JP | 2005-051963 | 2/2005 |

* cited by examiner

*Primary Examiner*—Dang D Le
(74) *Attorney, Agent, or Firm*—Jordan and Hamburg LLP (57) ABSTRACT

A stator has a stator base including a printed circuit board provided on a nonmagnetic or weakly magnetic bracket having a shaft support section disposed in the center thereof, a single-phase connected air-cored armature coil provided on the stator base, and a drive circuit member provided on the stator base so as not to overlap the air-cored armature coil. The stator base has a groove hole extending outwardly from a central through hole. A detent torque section extending radially from the center of a detent torque generating member composed of a magnetic body and provided around the shaft support section is accommodated in the groove hole so as to be confined in the stator base in the thickness direction thereof.

2 Claims, 6 Drawing Sheets

FIG. 6

STATOR AND AXIAL-GAP BRUSHLESS VIBRATION MOTOR INCORPORATING THE STATOR

BACKGROUND OF THE INVENTION

1. Field of the Invention

The present invention relates to a thinly shaped stator that can be advantageously used, for example, in soundless alarm mechanisms of mobile communication devices, and to an axial-gap brushless vibration motor equipped with the stator.

2. Description of the Related Art

A coreless slotless motor comprising one bearing has been suggested as a flat axial-gap brushless vibration motor, as disclosed, for example, in Japanese Utility Patent Application No. 4-137463 and Japanese Patent Application Laid-open No. 2002-143767.

A cored noncircular motor in which a drive circuit member is disposed on the side of a stator and which comprises a core with armature coils wound about a plurality of equidistantly spaced poles is known, for example, from Japanese Utility Patent Application No. 2000-245103.

However, such motors have a large size in the sidewise direction and poor mounting efficiency with an SMD system on a set printed wiring board. Moreover, because they are cored, the thickness thereof is inevitably large and they have poor utility.

Furthermore, motors of cored, and slotless and coreless types, have also been suggested in which some of a plurality of armature coils were removed to provide a cavity and a drive circuit member was disposed in the cavity, for example, in Japanese Patent Application Laid-open No. 2002-142427 (FIGS. 8-11).

SUMMARY OF THE INVENTION

In a single-phase system driven by a single Hall sensor, a detent torque generating member composed of a magnetic body is necessary to stop the position of the magnet of the rotor in a specific location in which it can be reliably actuated in the next turn.

This detent torque generating member has to have a certain thickness to obtain the prescribed detent torque generating force. Therefore, when it is disposed on a bracket, it is difficult to find space for disposition, and thus difficult to reduce the thickness of the motor itself.

Furthermore, when this detent torque generating member is formed, for example, by printing, certain thickness and width are necessary to obtain the required detent torque generating force. If the width is increased, the position of the detent torque generation section becomes unstable, and if the width is decreased, the thickness essentially always has to be sacrificed.

On the other hand, a structure was also suggested in which a detent torque section of the detent torque generating member is accommodated in the inner diameter section of a hollow armature coil and the thickness of the detent torque generating member essentially can be ignored. However, the problem encountered with this approach is that a limitation is placed on the inner diameter of the coil, and the number of coil turns cannot be increased. Thus, the arrangement position of the detent torque section has to be intentionally displaced from the center of the magnetic pole in order to avoid the starting error, or from the coil center so that it can be stopped in any neutral position. If the inner diameter of the coil is small, this displacement angle cannot be increased. If the prescribed displacement angle cannot be maintained, the number and positions of the effective conductor sections contributing to the torque are sacrificed, causing a reduction of the starting torque.

Accordingly, it is an object of the present invention to provide a very thin stator making it possible to ignore completely the disposition thickness of the detent torque section of the detent torque generating member, and to obtain the prescribed optimum position (displacement angle) of the detent torque generating member, regardless of the value of the inner diameter of the coil.

A further object is to provide an axial-gap brushless vibration motor equipped with such a rotor.

SUMMARY OF THE INVENTION

In order to resolve the above-described problem, the present invention provides a stator comprising a nonmagnetic or weakly magnetic bracket having a shaft support section disposed in the center thereof, a stator base comprising a printed circuit board additionally provided on the bracket. A single-phase air-cored armature coil is provided on the stator base, and a drive circuit member is also provided on the stator base so as not to overlap the single-phase air-cored armature coil. A detent torque generating member is further provided which comprises a magnetic body, wherein at least part of the detent torque generating member is accommodated inside the stator base in the thickness direction thereof. In accordance with such configuration, the detent torque section of the detent torque generating member is included in the thickness of the stator base. Therefore, the thickness thereof can be ignored and it can be set in a position that is not correlated with the inner diameter of the air-cored armature coil. As a result, the inner diameter of the air-cored armature coil can be reduced, and the number of turns can be increased, thereby making it possible to obtain a sufficient starting torque and preventing the members constituting the stator from overlapping. A very thin structure can thus be obtained.

In accordance with a further embodiment, the stator base may comprise a central through hole and at least one groove hole extending outwardly from the central through hole, and at least one detent torque section extending radially may be present in the detent torque generating member as part of the detent torque generating member, and this detent section may be accommodated in the groove hole. By virtue of this structure, alignment of the detent torque section is facilitated and the detent torque generating member can be set to a stable constant position.

In another embodiment, the shaft support section may comprise a plurality of support sections protruding from the nonmagnetic or weakly magnetic bracket, and a bearing provided on the inside of the support sections and a reinforcing member may be provided on the outer periphery of the support sections. Alternatively, the bearing support section may comprise a cylindrical metallic bearing holder integrated with the bracket and a bearing provided inwardly of the metallic bearing holder, wherein the outer periphery of the metallic bearing holder may be reinforced. These features allow the shaft support section to be easily configured without using other members, and permits the shaft support section to be configured from a metallic bearing holder allowing a sufficient strength to be obtained.

In order to obtain an axial-gap brushless vibration motor by using the above-described stator, the motor comprises the stator, and the rotor assembled with the stator via an axial gap, wherein the rotor comprises a rotor yoke, an axial-gap magnet fixedly mounted on the rotor yoke, and an arch-like eccentric weight. The eccentric weight is fixedly mounted on the outer periphery of the magnet, and a part thereof is fixedly mounted on the rotor case. An external case is attached to the stator so as to cover the rotor. With this configuration, a thin vibration motor in which the thickness of the detent torque generating member can be ignored can be obtained as an axial-gap motor.

In accordance with another embodiment of the invention, in addition to functioning as a vibration motor, the motor can be used for a central magnetic pole of an electromagnetic acoustic converter. In this case, because the detent torque section of the detention torque generating member is sufficiently separated from the magnetic portions of the external case, it is not affected by the magnetic field of an exciting magnet of the electromagnetic acoustic converter.

In accordance with a particularly advantageous embodiment, in the stator, a stator base comprising a printed circuit board is additionally provided on a nonmagnetic or weakly magnetic bracket having a shaft support section disposed in a center, a single-phase air-cored armature coil provided on the stator base, and a drive circuit member is provided on the stator base so as not to overlap the single-phase air-cored armature coil. The stator base comprises a central through hole for mounting the shaft support section and 2 to 4 groove holes extending outwardly from the central through hole. A detent torque generating member comprising a magnetic body is provided around the shaft support section, and a detent torque section extending radially from the detent torque generating member is accommodated in the groove hole.

DETAILED DESCRIPTION OF THE PREFERRED EMBODIMENT

Figure 1:
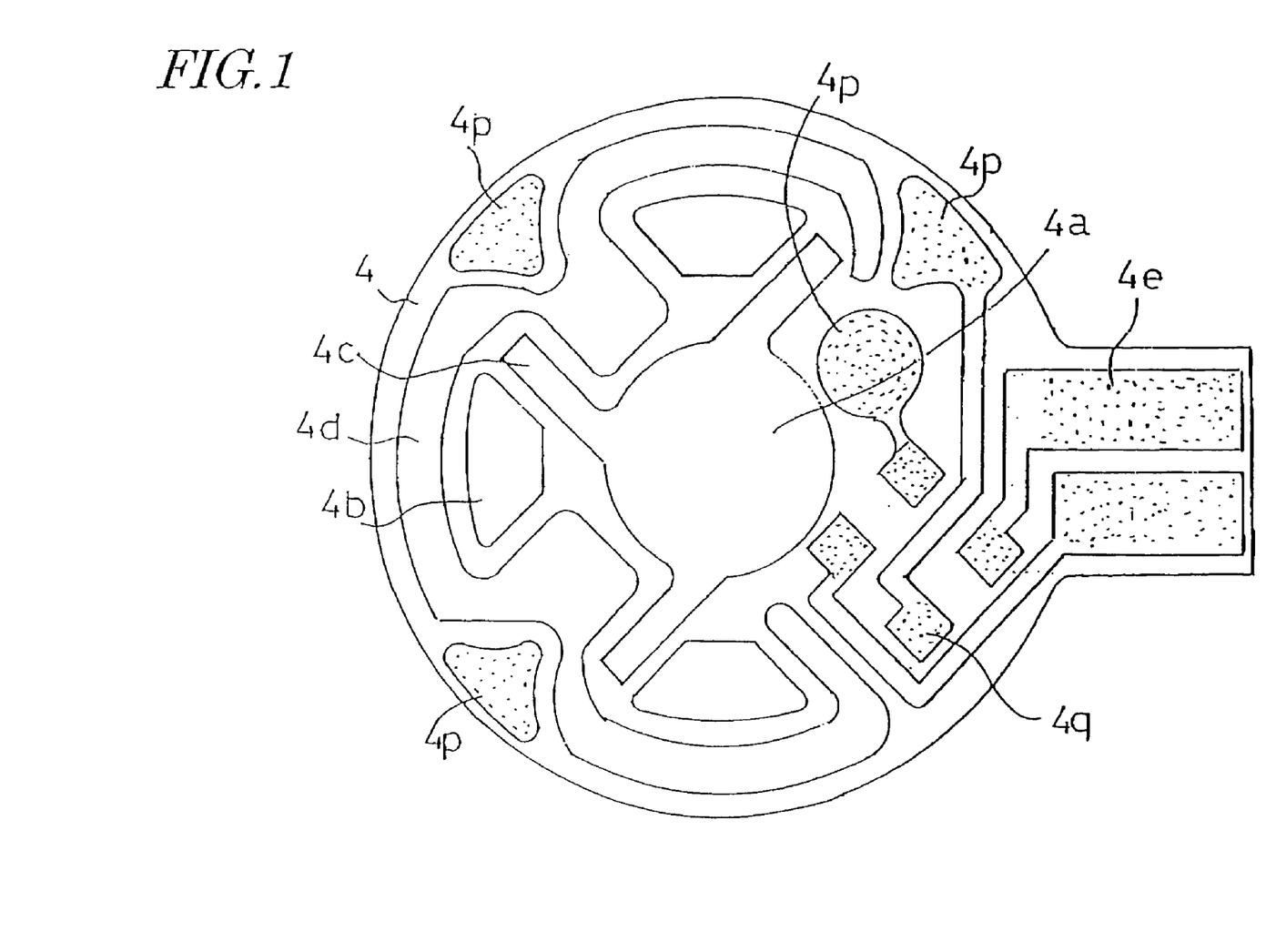
FIG. 1 is a plan view of a stator base as a main member constituting the stator of the present invention.
Figure 2:
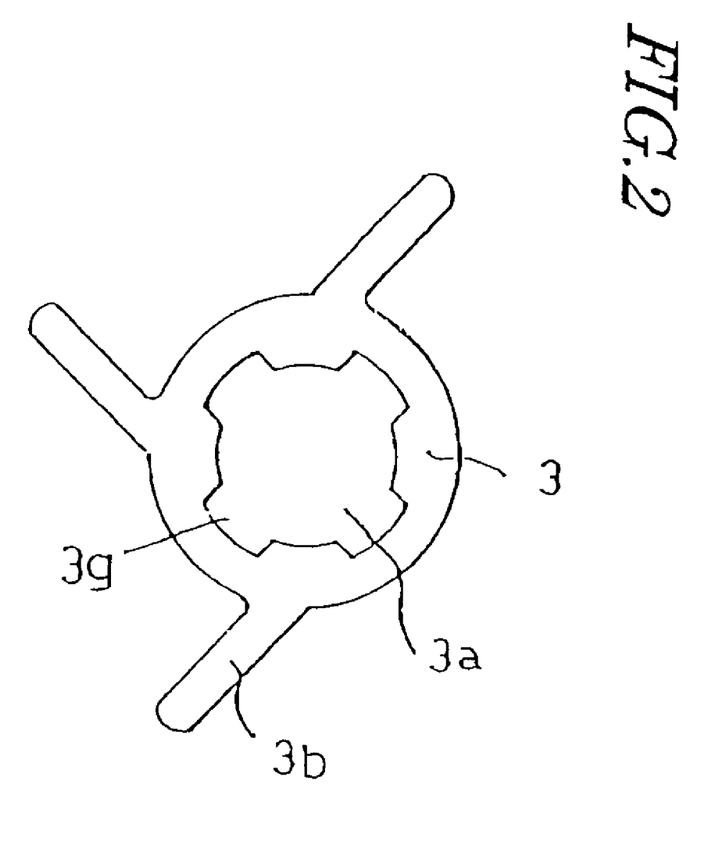
FIG. 2 is a plan view of a detent torque generating member mounted on the stator base.
Figure 3:
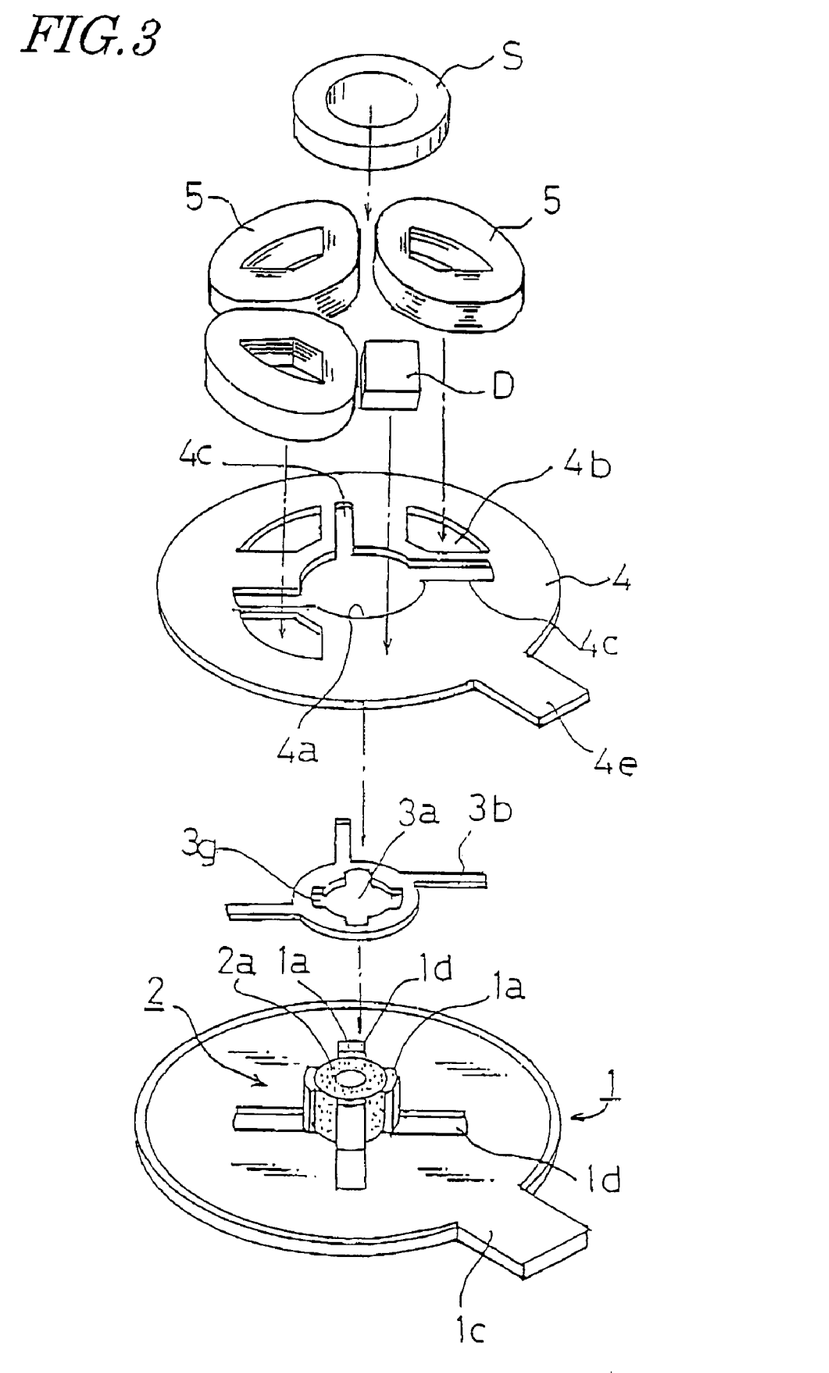
FIG. 3 is an assembly drawing of the stator comprising the aforementioned members.

Referring to FIG. 1 to FIG. 3, a bracket 1 constituting the stator of the present invention is formed from a nonmagnetic or weakly magnetic stainless steel sheet so as to have a thin shape with a thickness of about 0.2 mm. Four columnar members 1a are punched out and raised by pressing the center of the bracket, and a sintered oil-impregnated bearing 2a constituting a shaft support section 2 is accommodated via a thrust washer 2b, such as shown in the below-described FIG. 4, in the bottom section on the inner side of columnar members 1a. A power supply terminal stand section 1c is further provided sidewise on the bracket.

A detent torque generating member 3 comprising a magnetic stainless steel sheet with a thickness of about 0.1 mm is disposed by fitting into the columnar members 1a of the shaft support section 2 on the upper surface of the bracket 1.

The detent torque generating member 3 is provided with a through hole 3a having guides 3g matching the pitch of the columnar supports as a central section and detent torque sections 3b formed radially from the central section with the same pitch as the groove holes formed in the below-described stator base.

A stator base 4, which is to be assembled with the detent torque generating member 3, is made from a glass cloth epoxy substrate with a thickness of about 0.15 mm that has a printed wiring land. A through hole 4a for mounting on the central contour of the detent torque generating member 3 and guide holes 4b, which serve for mounting the air-cored armature coils and are formed with a pitch of 90° outward of the through hole, are provided in the central section of the stator base. Three groove holes 4c are linked to the through hole 4a and provided with an arrangement opening angle of 90° in the radial direction. In order to compensate for a loss of strength caused by the groove holes, a disposable pattern 4d, an air-cored armature coil connection pattern 4p, and a connection pattern 4q of a drive circuit member D are formed in the prescribed locations.

The groove holes 4c are provided in positions with an arrangement opening angle of about 22.5° from the center of the guide holes 4b for mounting the armature coils, which are the centers of the air-cored armature coils that have to be positioned therein. In order to ensure the strength of a thin stator base, the groove holes are separated from the guide holes 4b for mounting the armature coils, so as not to be linked therein, and are provided with an inclination so as to be at about 90° from the predetermined positions of the central wire of each coil. A power supply terminal section 4e is provided sidewise in an extending condition in the location of the power supply terminal stand section. As a matter of course, the land patterns, excluding the sections connected by soldering shown as shaded portions, are subject to a resist process.

The arrangement positions of the detent torque sections 3b are at 22.5° from the center of the coil because, when the opening angle of magnetic poles of the axial gap magnet of the rotor, which is to be assembled, is 90°, those positions allow the magnet to be stopped in both the peaks and the neutral zones of the magnetic poles In the case where the axial gap magnet of the rotor, which is to be assembled, has 6 magnetic poles with a pole opening angle of 60°, the arrangement opening angle of the detent torque section 3b is preferably set to 15° from the center of the coil.

In the stator base 4, in the assembly shown in FIG. 3, a total of three air-cored armature coils 5 wound with the winding shaft of approximately the same size as that of the guide holes 4b for mounting the air-cored armature coils, as shown in the same figure, are fixedly attached in the positions of the guide holes 4b for mounting the air-cored armature coils with a UV-curable anaerobic adhesive by using a jig or the like, and the terminals thereof are connected by soldering to the prescribed wiring pattern 4p so as to obtain a single phase.

A configuration comprising three air-cored armature coils is shown above, but the configuration may also comprise one air-cored armature coil, if allowed by the thickness, or four coils, if the drive circuit member D is not an obstacle, in order to decrease the thickness further, provided that it is a single-phase connection.

In FIG. 3, the terminals of air-cored armature coils and connection land patters are omitted because they make the drawing difficult to understand.

The aforementioned guide hole 4b for mounting the armature coils is not required if a process is used by which the coils are fit into a jig when the air-cored armature coils 5 are mounted, an adhesive is applied, and then the stator base 4 is covered and adhesively bonded.

The drive circuit member D incorporating a Hall sensor for driving the air-cored armature coil 5 is connected by soldering in a position such as to avoid superposition on the air-cored coil 5 in the planar view thereof and also to obtain an adequate electric neutral point. Here, the position of the incorporated Hall sensor is determined according to magnetic poles of the magnet which is to be assembled. With the magnet comprising four magnetic poles, the Hall sensor is arranged so as to come into any position at 45°, 90°, 135°, and 180° from the center of the air-cored armature coil.

Such stator base 4 is additionally provided on the bracket 1 via a UV-curable anaerobic adhesive. At this time, the detent torque section 3b is installed in the groove hole 4c, and the through hole 4a is confined outwardly of the central section contour of the detent torque generation member 3. Therefore, in the detent torque generation member 3, at least the detent torque section 3b is completely confined in the stator base 4 in the thickness direction thereof. As a result, the thickness thereof can be completely ignored. Thus, the detent torque generation member can be set in the optimum position allowing a sufficient starting torque to be obtained without unnecessarily confining it within the inner radius of the air-cored armature coil.

With such an assembly, the orifice 1d formed after the columnar supports 1a have been raised is closed by the stator base 4, thereby making it possible to prevent the penetration of foreign matter.

Figure 4:
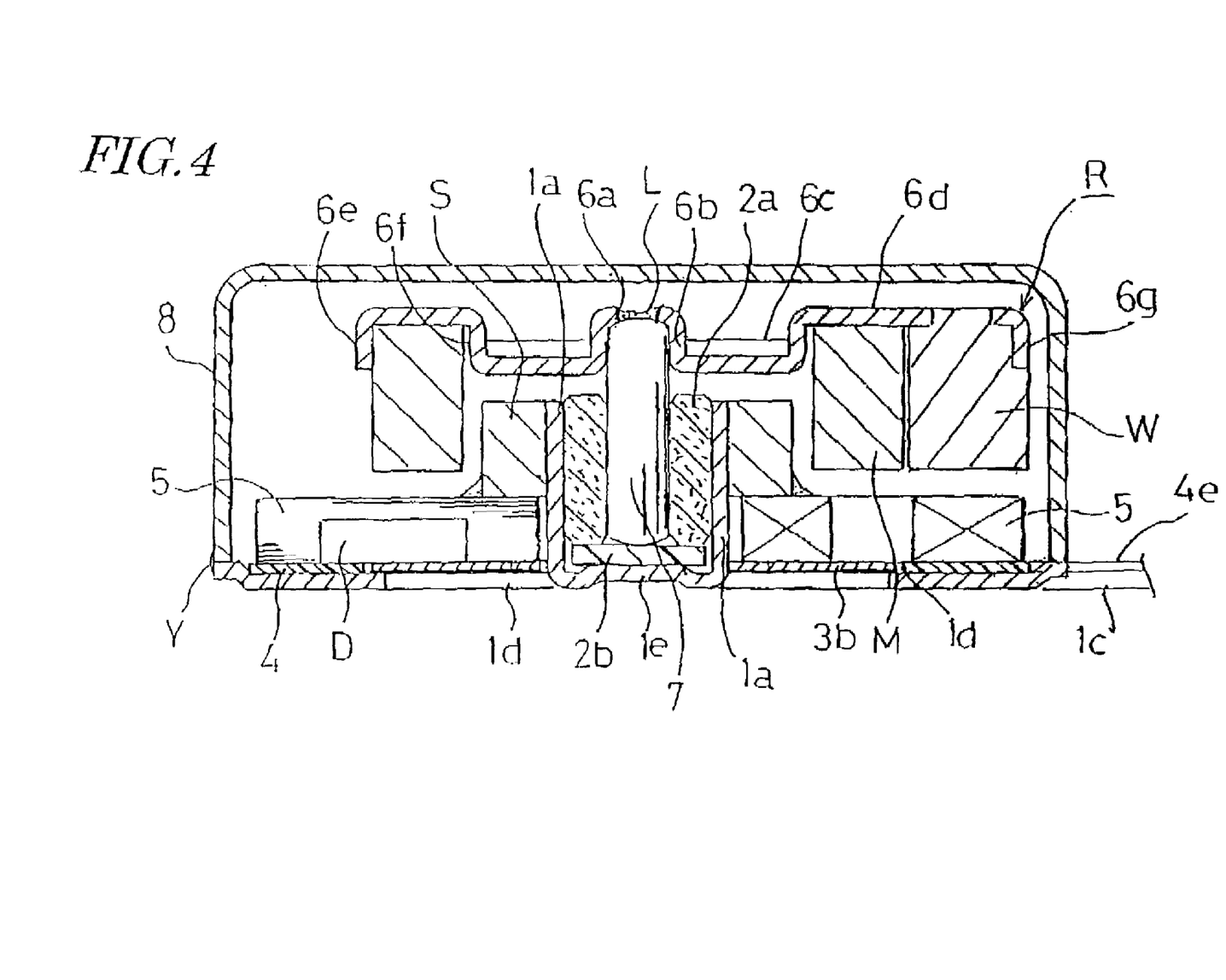
FIG. 4 is a vertical sectional view of an axial-gap brushless vibration motor comprising this stator.

Turning now to FIG. 4, a brushless vibration motor of an axial gap type and a coreless and slotless system with a rotary shaft comprising the above-described stator is shown.

The configuration of the stator, with the exception of a part thereof, has already been explained, and the explanation thereof is therefore omitted. In order to improve the strength of columnar supports 1a, a ring washer S made form vulcanized fibers is press fitted on the outer periphery of the columnar supports 1a by using the detent space in the thickness direction provided by the below-described structure of the rotor, and the lower section of the washer S is securely fixed with the above-described adhesive to the part of the upper surface of the air-cored armature coil 5.

Because of such reinforcement with the ring washer S, impact strength in the radial direction is ensured even with thin columnar supports.

The base end of the shaft 7 is received by a thrust washer 2b inserted below the sintered oil-impregnated bearing 2a and supported by a slightly raised receiving section 1e of the bracket 1.

Because this receiving section 1e is arch-like raised inwardly, it has high resistance to impacts, e.g., when the device is dropped.

Such eccentric rotor R is accommodated in an outer case 8 constituting a housing and assembled by laser welding Y with the outer periphery of the bracket 1 in the open section thereof.

The eccentric rotor R facing the stator via the axial gap comprises an axial gap magnet M, an arch-like eccentric weight W provided in part of the outer periphery of the magnet M, a rotor case 6 with a thickness of about 0.15 mm that serves to secure the magnet and the eccentric weight, and a shaft 7 secured to the rotation center of the rotor case 6. The shaft 7 is press fitted in the rotation center of the rotor case 6, a burring-shaped shaft holding section 6b is provided which has a small-diameter section 6a for receiving the distal end of the shaft, and a reinforcing rib 6c is formed as a continuation of the shaft holding section 6b.

The rotor case 6 has formed therein a flat section 6d for adhesively bonding the upper section of the magnet M and a first outer-diameter descending section 6e and an inner-diameter descending section 6f connected to the flat section.

Part of the outer-diameter descending section is extended as a second outer-diameter descending section 6g that covers part of the outer-diameter part of the eccentric weight W.

The reinforcing rib 6c is joined to the inner-diameter descending section 6f. Therefore, sufficient strength can be ensured even with a thin rotor case.

Here, the distal end of the shaft 7 is further laser welded 1 to ensure strength.

When the magnet M is joined adhesively, the joining strength is ensured by the inner-diameter descending section 6f and outer-diameter descending section 6e, a sufficient strength of the eccentric weight W is similarly ensured by the second outer-diameter descending section 6g extending along the outer-diameter section of the magnet M and a tongue-groove joining with part of the rotor case 6.

The open section of the external case 8 covering the eccentric rotor is attached by laser spot welding at the outer periphery of the bracket 1 on the stator side.

Figure 5:
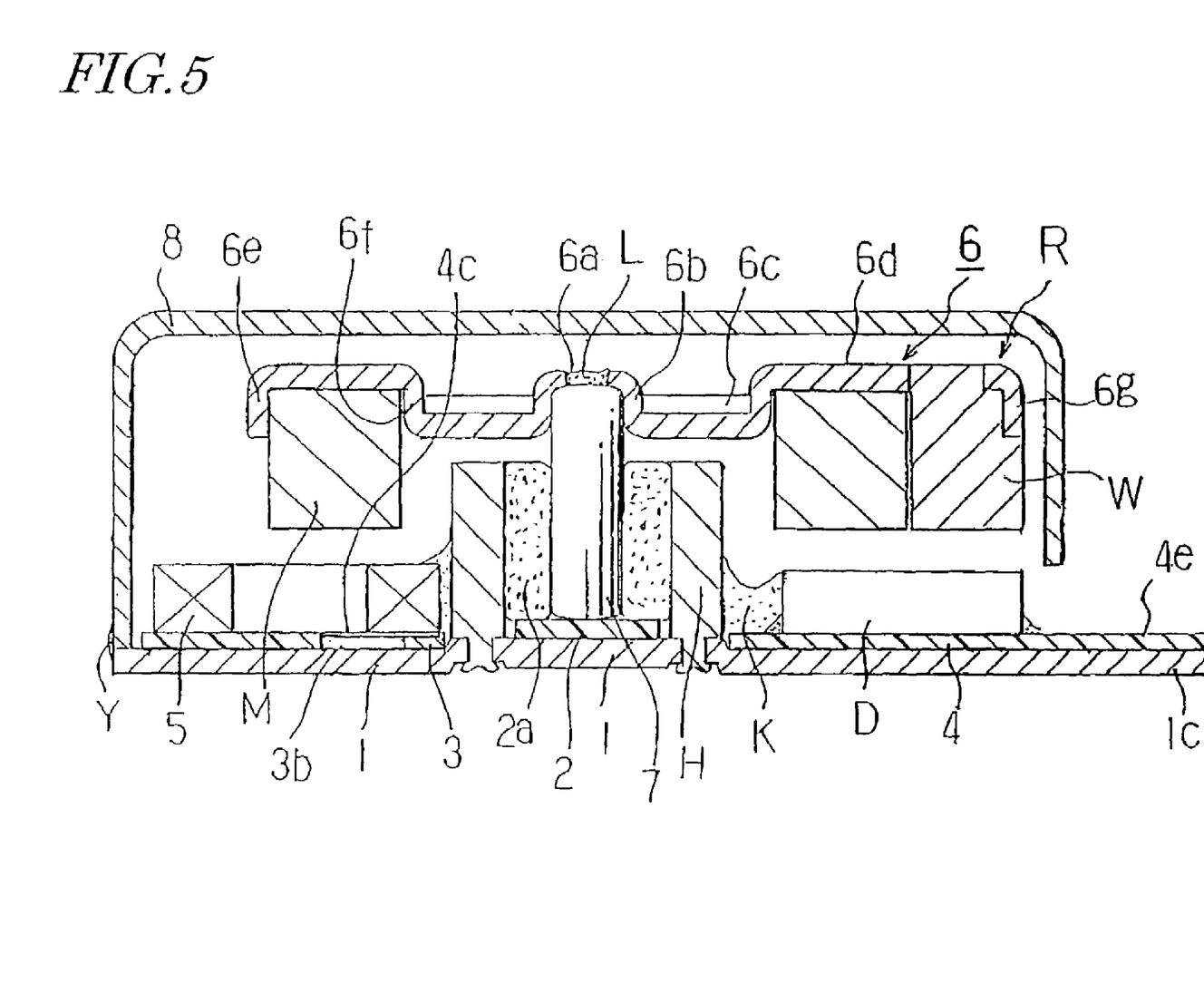
FIG. 5 is a cross-sectional view of the main portion of a modification example of the stator portion shown in FIG. 4.

In the configuration shown in FIG. 5, a cylindrical brass bearing holder H is integrated, for example, by tightening, as a shaft support section in a modification example of the stator section, and a sintered oil-impregnated bearing is provided inside thereof.

Components identical to those of the above-described embodiment are assigned with identical symbols and the explanation thereof is omitted.

The cylindrical brass bearing holder H is reinforced by bonding with a UV-curable adhesive K on the outer periphery thereof so that the adhesive penetrates inside the air-cored armature coil 5 and drive circuit member D.

With such configuration, a sufficient strength can be ensured even if the tightening strength of the cylindrical brass bearing holder H is insufficient.

Figure 6:
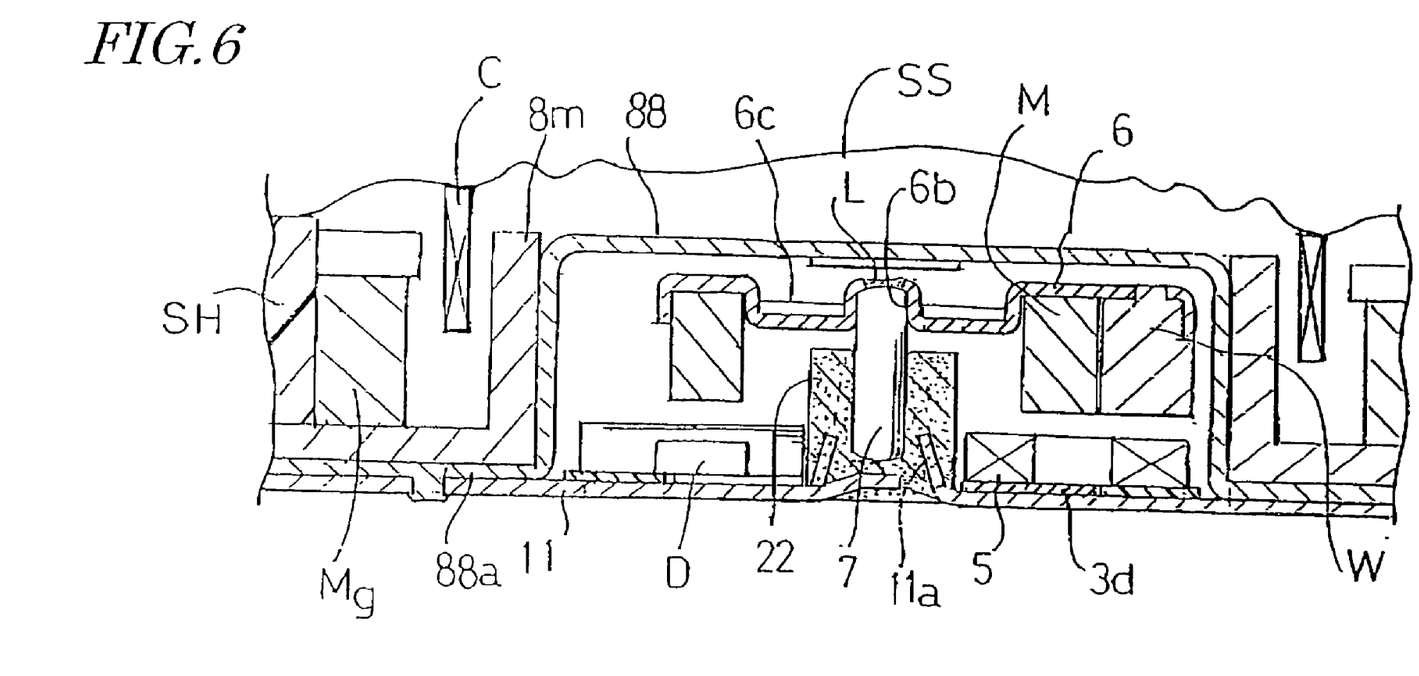
FIG. 6 is a cross-sectional view of the main portion of another modification example.

FIG. 6 shows another configuration in which the bearing is constituted by a resin with good sliding properties as a shaft support section in a modification example of the stator portion.

Thus, a plurality of support skeleton pieces 11a similar to the shortened columnar supports 1a are raised from the bracket 11, and a resin bearing is formed as a shaft support section 22 so that the support skeleton pieces 11a are embedded therein. The openings formed by raising the support skeleton pieces are filled with part of the resin bearing, thereby ensuring good external appearance and strength.

With such a configuration, the sintered oil-impregnated bearing can be eliminated.

This FIG. 6 shows a configuration that can be advantageously employed in the central magnetic pole of an electromagnetic acoustic converter, where the lower section of an external case 88 is extended circumferentially as a flange 88a and assembled by a tongue and groove joint with the bracket 11 of the stator, and a magnetic body 8m is provided on the circumference of the external case 88. In the figure, Mg stands for an excitation magnet for speakers, C an excitation coil, SS a vibration thin plate, and SH a speaker housing.

Here, in the external case 88, at least the ceiling section hereof is made nonmagnetic so that the magnetic force of the excitation magnet Mg of the speaker does not effect the magnet of the rotor, and the magnetic field of the excitation magnet Mg in this case is received by the magnetic body 8m. If the radial size becomes a problem when the magnetic body 8m is disposed separately, a disk-like shape may be used, the ceiling section may be made nonmagnetic, and the magnetic body may be secured to the side periphery.

Because the detent torque section on the stator side is separated from the external case 88, the effect of the excitation magnet Mg of the speaker is prevented.

The stator in accordance with the present invention can be employed, not only in the vibration motors, but also in the usual single-phase brushless motors of rotation type such as fan motors of general use. Furthermore, if a shaft is fixed to the shaft support section, the invention is also applicable to fixed-shaft stators. In this case, the bearing may be provided in the rotor and the distal end of the shaft may be fixed to the external case.

The present invention can be implemented in a variety other embodiments, without departing from the technical concept and features thereof. Accordingly, the above-described embodiments are merely illustrative and should not be construed as limiting. The technical scope of the invention is described by the claims and is not restricted by the text of the specification.

What is claimed is:

1. A stator, comprising:

one of a nonmagnetic and weakly magnetic bracket having a shaft support section disposed in a center thereof;

said shaft support section comprising a plurality of support sections protruding from said bracket and a resin bearing is formed such that said support sections are embedded therein;

a stator base including circuitry carried thereon being further disposed on the bracket;

at least one single-phase air-cored armature coil provided on the stator base;

a drive circuit member being disposed on the stator base so as not to overlap said at least one single-phase air-cored armature coil; and a detent torque generating member comprising a magnetic body, at least a part of the detent torque generating member being accommodated inside the stator base in a thickness direction thereof.

2. A stator according to claim 1 wherein openings are created by formation of the support sections, said openings being at least partially filled by a portion of said resin bearing.

* * * * *